(12) United States Patent
Ewing et al.

(10) Patent No.: US 6,218,026 B1
(45) Date of Patent: *Apr. 17, 2001

(54) LIGHTWEIGHT HIGH STIFFNESS MEMBER AND MANUFACTURING METHOD THEREOF

(75) Inventors: Bruce Allan Ewing, Martinsville; Robert Anthony Ress, Jr., Carmel; James Ronald Roessler, Indianapolis, all of IN (US)

(73) Assignees: Allison Engine Company; Allison Advanced Development Company, both of Indianapolis, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/045,878

(22) Filed: Mar. 3, 1998

Related U.S. Application Data

(63) Continuation-in-part of application No. 08/470,180, filed on Jun. 7, 1995, now Pat. No. 5,724,643.

(51) Int. Cl.[7] .................................. B22F 7/04; B22F 3/14
(52) U.S. Cl. ................................ 428/553; 419/8; 419/29; 419/49; 419/9
(58) Field of Search .................................... 419/8, 29, 49, 419/9; 428/381, 389, 553

(56) References Cited

U.S. PATENT DOCUMENTS

| | | |
|---|---|---|
| Re. 32,389 | 4/1987 | Becker et al. . |
| 3,098,022 | 7/1963 | Karnie . |
| 3,168,399 | 2/1965 | Takahashi et al. . |
| 3,509,617 | 5/1970 | Winter . |
| 3,678,567 | 7/1972 | Manilla et al. . |
| 3,892,030 | 7/1975 | De Pierre et al. . |
| 3,899,325 | 8/1975 | Harrison . |
| 4,077,109 | 3/1978 | Larson . |

(List continued on next page.)

FOREIGN PATENT DOCUMENTS

| | | |
|---|---|---|
| 3409581 A1 | 9/1984 | (DE) . |
| 4027564 A1 | 3/1992 | (DE) . |
| 4240045 C1 | 3/1994 | (DE) . |
| 0747155A1 | 12/1996 | (EP) . |
| 2002 817 | 8/1979 | (GB) . |

*Primary Examiner*—Daniel J. Jenkins
(74) *Attorney, Agent, or Firm*—Woodard, Emhardt, Naughton, Moriarty & McNett

(57) ABSTRACT

A high performance hybrid member for use in applications where high stiffness, high temperature capacity and being lightweight are important. In one form of the present invention the hybrid member is formed of a titanium alloy outer portion with a gamma titanium aluminide alloy inner portion metallurgically bonded therin. The gamma titanium aluminide alloy material has a room temperature modulus of elasticity greater than the modulus of elasticity of the titanium alloy outer portion. The hybrid member has a modulus of elasticity greater than modulus of elasticity of the titanium alloy outer portion, and a density equivalent to that of the titanium outer portion. The wear resistant capability of the member can be increased at local regions by surface modification treatment such as plasma ion nitriding or by affixing at ends of the member hardened fittings. Fabrication of the hybrid member involves positioning a gamma titanium aluminide alloy core within the titanium alloy outer portion, sealing the ends of the outer portion and then hot isostatically pressing the assembly to create a metallurgical bond between the gamma titanium aluminide alloy inner portion and the titanium alloy outer portion.

55 Claims, 5 Drawing Sheets

U.S. PATENT DOCUMENTS

| | | |
|---|---|---|
| 4,143,208 | 3/1979 | Aslund . |
| 4,147,837 | 4/1979 | Nieman . |
| 4,270,256 | 6/1981 | Ewing . |
| 4,364,162 | 12/1982 | Nilsson et al. . |
| 4,544,523 | 10/1985 | McCollough et al. . |
| 4,584,170 | 4/1986 | Aslund et al. . |
| 4,596,694 | 6/1986 | Rozmus . |
| 4,647,426 | 3/1987 | Fiorenzino . |
| 4,747,225 | 5/1988 | Gsettner et al. . |
| 4,748,088 | 5/1988 | Billgren . |
| 4,756,677 | 7/1988 | Hribernik et al. . |
| 4,765,952 | 8/1988 | Kemp, Jr. . |
| 4,820,141 | 4/1989 | Shingu et al. . |
| 4,834,693 | 5/1989 | Profant et al. . |
| 4,896,815 | 1/1990 | Rosenthal et al. . |
| 4,965,043 | 10/1990 | Tornberg . |
| 4,966,748 | 10/1990 | Miyasaka et al. . |
| 4,976,915 | 12/1990 | Kuroki . |
| 4,977,034 | 12/1990 | Wang . |
| 5,004,653 | 4/1991 | Kroisenbrunner . |
| 5,043,137 | 8/1991 | Lazcano-Navarro et al. . |
| 5,043,320 | 8/1991 | Meyer et al. . |
| 5,082,623 | 1/1992 | Ekbom . |
| 5,093,209 | 3/1992 | Kroisenbrunner . |
| 5,130,084 | 7/1992 | Matheny et al. . |
| 5,154,882 | 10/1992 | Zick . |
| 5,318,214 | 6/1994 | Lucas, Jr. et al. . |
| 5,724,643 | 3/1998 | Ewing . |

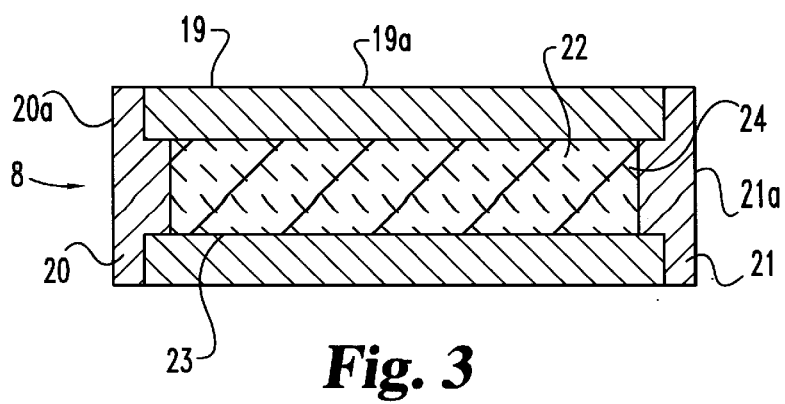
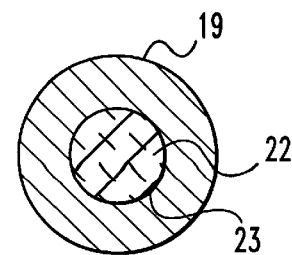
Fig. 3  Fig. 4
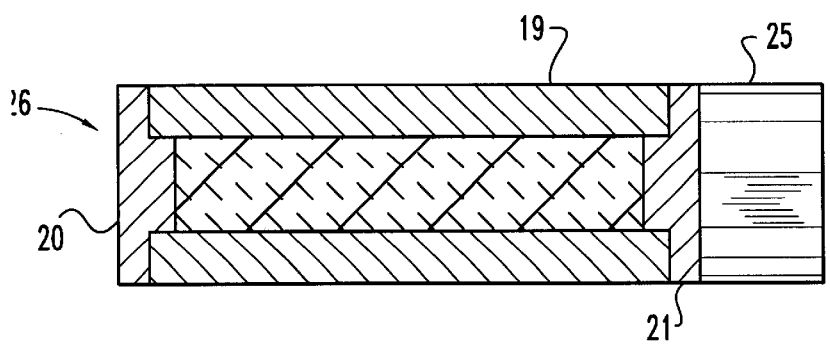
Fig. 5
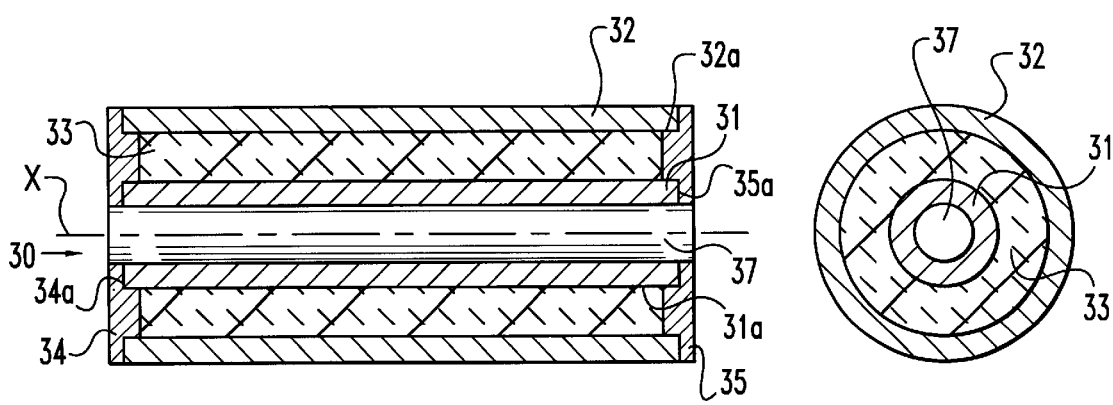
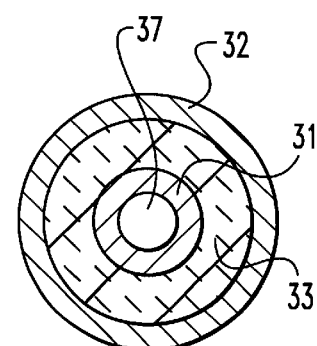
Fig. 6  Fig. 7

LIGHTWEIGHT HIGH STIFFNESS MEMBER AND MANUFACTURING METHOD THEREOF

RELATED APPLICATIONS

This application is a continuation-in-part of allowed U.S. patent application Ser. No. 08/470,180 filed Jun. 7, 1995, now U.S. Pat. No. 5,724,643 which is incorporated herein by reference.

BACKGROUND OF THE INVENTION

The present invention relates generally to the design and fabrication of a lightweight titanium member having stiffness and temperature characteristics that could allow the design of lighter, simpler and more cost effective mechanical arrangements. More particularly, the present invention has one form wherein a high performance shaft is formed of a titanium alloy tube having a gamma titanium aluminide alloy core metallurgically bonded therein. This high performance hybrid shaft has significantly increased stiffness over conventional titanium alloy shafts with no effective increase in density. Although the invention was developed for use in a gas turbine engine, certain applications may be outside of this field.

It is well known that a gas turbine engine integrates a compressor and a turbine that have components that rotate at extremely high speeds and the components are generally subjected to elevated temperatures. The rotatable components are coupled to shafts which are also subjected to the temperatures and loading inherent to most gas turbine engines. The necessity for reliable and durable shafts has resulted in the utilization of steel and nickel based alloy materials. In spite of their relatively high density and the cost and difficulty associated in manufacturing shafts from these materials they have been utilized extensively to produce gas turbine engine shafts. However, gas turbine engine designers continuously strive to decrease the weight of rotating gas turbine engine components which provides many benefits including a reduction in the centrifugal forces generated by these components. Further, the reduction in weight of the components in an aircraft gas turbine engine reduces the power consumed in the propulsion of these components.

Designers of gas turbine engines are fully cognizant that one technique for reducing the weight of gas turbine components is to use lower density materials. As a result, the designers of gas turbine engine shaft systems have become interested in titanium alloys in order to produce a relatively lightweight shaft design. However, an inherent limitation with the use of titanium alloys for many designs is the relatively low stiffness which traditional titanium alloys exhibit.

The relatively recent development of titanium alloys based on an intermetallic compound, gamma titanium aluminide (TiAl), having good high temperature (to about 1600° F.) properties makes them ideal candidates for high temperature components within a gas turbine engine. This is because they exhibit improved stiffness characteristics. Further, because of their high strength to weight ratios, gamma titanium aluminides may be used to fabricate parts having substantially lighter weight then parts fabricated from steel or nickel based super alloy parts.

Although gamma titanium aluminides have material properties that are very desirable from a component design standpoint, they are brittle at room temperature and are considered generally hard to fabricate. For many applications involving gamma titanium aluminides, either fusion welding or brazing would probably be the most desirable techniques for joining the gamma titanium aluminide details to a similar material or to other high temperature materials. However, existing welding and brazing techniques have proved unsatisfactory in many respects for providing reliable high temperature joints for titanium aluminide alloys. Therefore, a need exists for a fabrication technique that can lead to a lightweight high stiffness shaft that can utilize the material characteristics of titanium aluminide in combination with dissimilar material combinations such as steel, nickel or conventional titanium where there unique toughness and hardness characteristics might be dictated by a multi-alloy fabricated system by design requirements.

Although the migration from contemporary steel and nickel based shafts to titanium alloy shafts is a step in the right direction, the need for additional improvement in producing a lightweight high stiffness shaft still remains. The present invention satisfies this need in a novel and unobvious way.

SUMMARY OF THE INVENTION

One form of the present invention contemplates a method for manufacturing an apparatus. The method, comprising: providing a member having in its interior a gamma titanium aluminide core having a modulus of elasticity greater than the modulus of elasticity of the member; and creating a metallurgical bond between the member and the gamma titanium aluminide core so that the apparatus has a modulus of elasticity greater than the modulus of elasticity that the member would have without the core being bonded to it.

Another form of the present invention contemplates an apparatus, comprising: a member having a core of gamma titanium aluminide material positioned within the member and the core is metallurgically bonded to the member, wherein the apparatus has a room temperature modulus of elasticity greater than the room temperature modulus of elasticity the member would have without the core bonded thereto and a density about equal to the density of the member.

Another form of the present invention contemplates a member, comprising: a tube; and a gamma titanium aluminide core positioned within and metallurgically bonded to the tube, wherein the member has a room temperature modulus of elasticity greater than the room temperature modulus of elasticity that the tube would have without the core bonded thereto and the member has a density about equal to the density of the tube.

Another form of the present invention contemplates an apparatus, comprising: a first segment comprising a first member having a first core of gamma titanium aluminide material positioned therein and metallurgically bonded thereto; a second segment comprising a second member having a second core of gamma titanium aluminide material positioned therein and metallurgically bonded thereto; and the first segment and the second segment are fixidly joined together, and further the apparatus has a room temperature modulus of elasticity greater than the room temperature modulus of elasticity that the first member or the second member would have without their respective core bonded therein and a density about equal to the density of the members.

One object of the present invention is to provide an improved lightweight high stiffness high temperature shaft and method of manufacture.

Related objects and advantages of the present invention will be apparent from the following description.

BRIEF DESCRIPTION OF THE DRAWINGS

FIG. 3 is a side elevational in full section of one form of the lightweight high stiffness member of the present invention.

FIG. 4 is an end view of the FIG. 3 member with the end cap removed.

FIG. 5 is a side elevational view of another form of the lightweight high stiffness member of the present invention including a hardened fitting joined thereto.

FIG. 6 is a side elevational view in full section of another form of the present invention having a double walled tube.

FIG. 7 is an end view of the FIG. 6 member with the end cap removed.

DESCRIPTION OF THE PREFERRED EMBODIMENT

Figure 1:
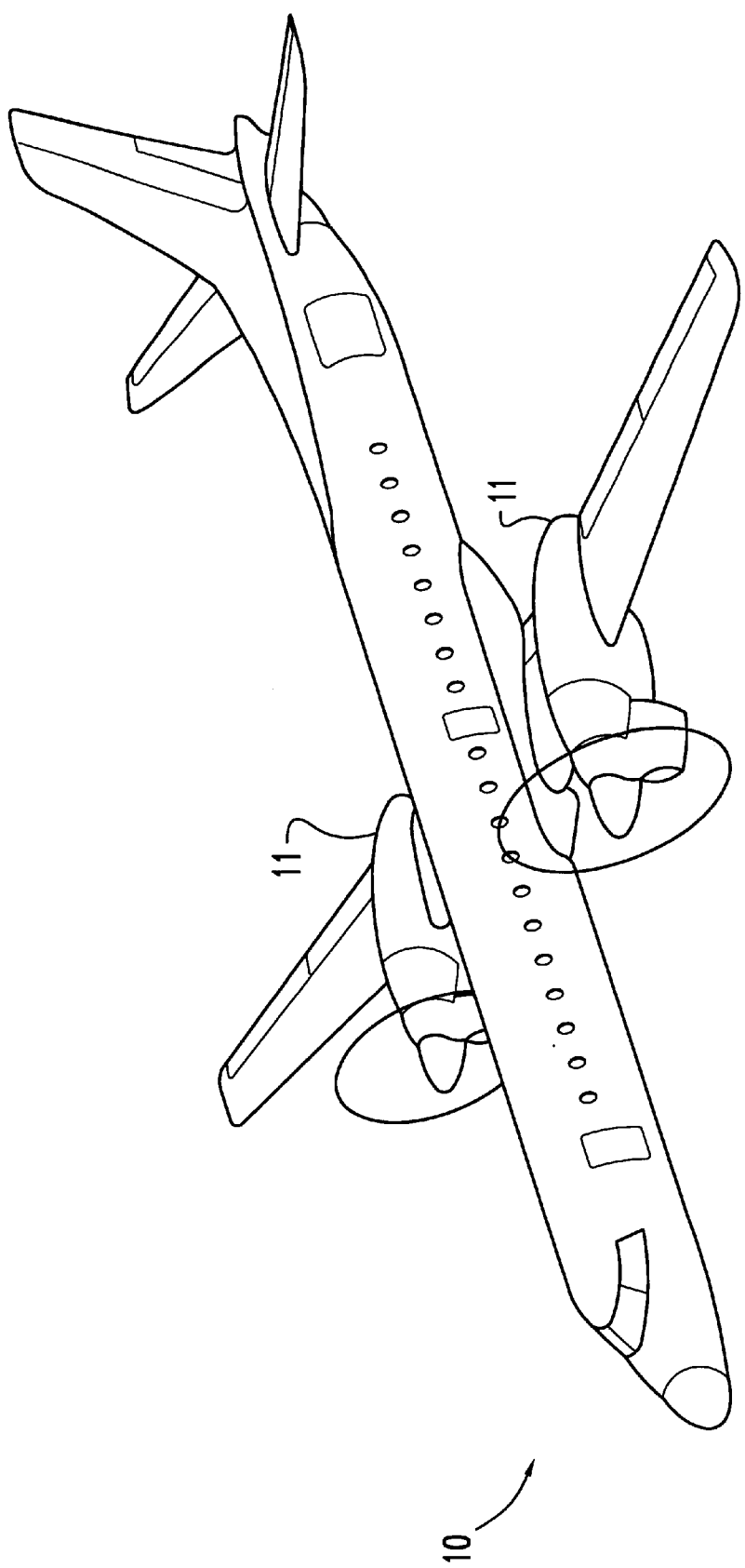
FIG. 1 is a perspective view of an aircraft having a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
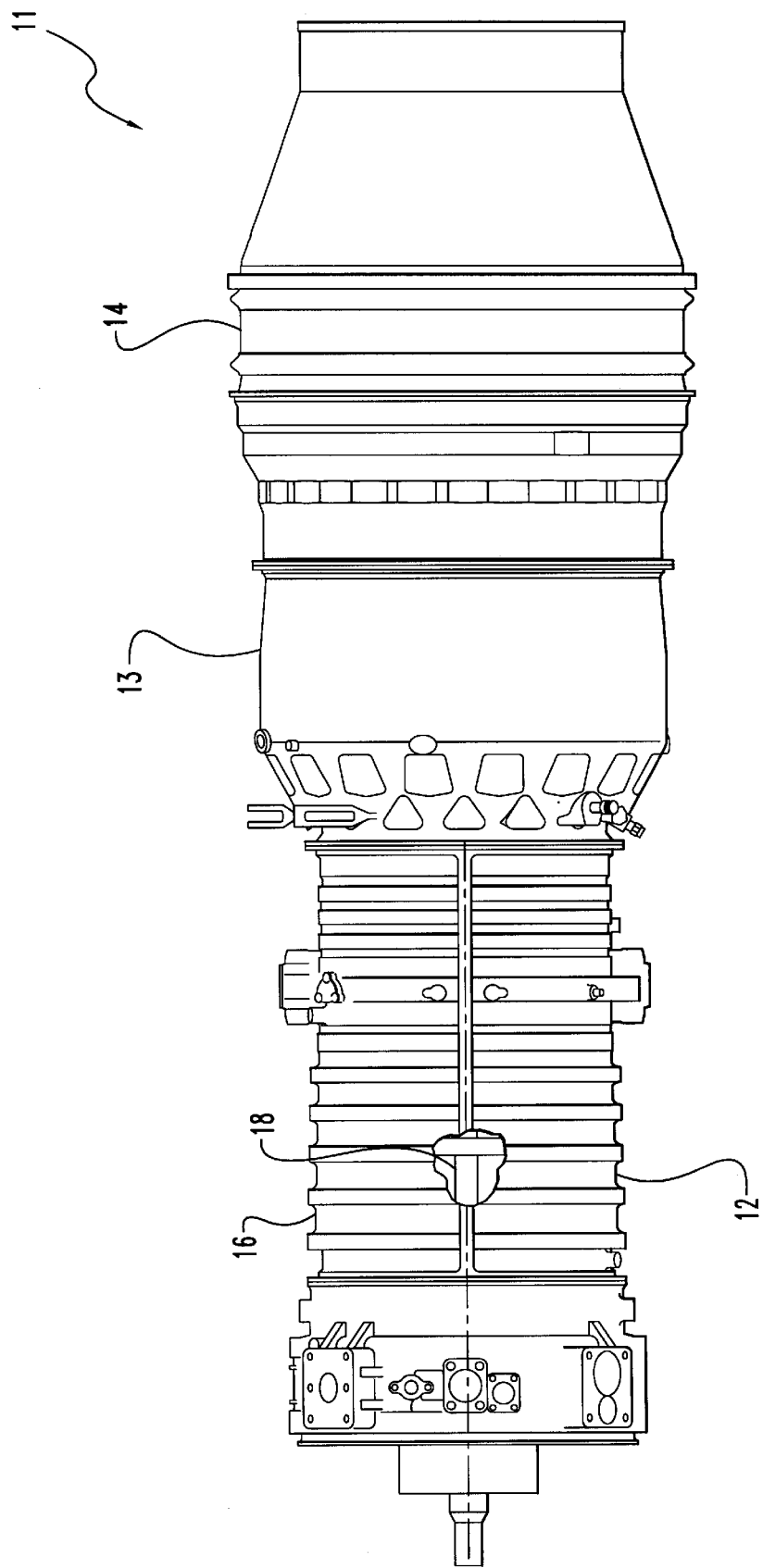
FIG. 2 is a partially fragmented enlarged side elevational view of the gas turbine engine of FIG. 1.

With reference to FIGS. 1 and 2, there is illustrated an aircraft 10 having an aircraft flight propulsion engine 11. It is understood that an aircraft is generic and includes helicopters, tactical fighters, trainers, missiles, and other related apparatuses. In one embodiment the flight propulsion engine 11 defines a gas turbine engine integrating a compressor 12, a combustor 13 and a power turbine 14. It is important to realize that there are a multitude of ways in which the components can be linked together. Additional compressors and turbines could be added with intercoolers connected between the compressors and reheat combustion chambers could be added between the turbines. Further, the gas turbine engine 11 is equally suited to be used for industrial applications. The compressor 12 for pressurizing a fluid includes a casing 16 and a plurality of blade rows that are fixadly mounted to a shaft 18. A preferred fluid of one form of the present invention is air. It is contemplated that the lightweight, high stiffness member of the present invention can be utilized in other mechanical devices besides a gas turbine engine. The present invention contemplates a lightweight high stiffness member that may define, but is not limited to; a shaft, a rod, an axle, a power transmission shaft, a valve stem, a brake rotor, a medical device, a compressor/turbine case, a compressor airfoil, an exhaust system flap detail, a bearing structure, and an actuator device for a variable geometry compressor design.

With reference to FIGS. 3–4, there is illustrated one embodiment of the member 18 which is designed for applications where high stiffness, lightweight and high temperature capabilities are important. The member 18 is being shown and described with reference to a shaft, however it is contemplated that other geometric shapes are within the contemplation of a person of ordinary skill in the art. The member 18 includes a substantially cylindrical outer member 19, a pair of circular end caps 20 and 21 and an inner member/core 22. In a preferred embodiment the substantially cylindrical outer member 19 is a tube formed of, but not limited to, a conventional titanium alloy, such as Ti-6Al-4V or Ti-6Al-2Sn-4Zr-2Mo. A person skilled in the art will recognize that the modulus of elasticity for a conventional titanium alloy is about 16×106 pounds per square inch (psi). Positioned within a central aperture 23 that extends longitudinally through the cylindrical outer member 19 is the inner member/core 22 that is formed from a gamma titanium aluminide alloy. In a preferred embodiment inner member/core 22 is formed of a gamma titanium aluminide alloy, such as, Ti-45Al-5Nb-1W (atomic percent). The room temperature modules of elasticity for a fully consolidated gamma titanium aluminide composition is about 24×106 psi. Therefore, the gamma titanium aluminide inner member/core 22 that is positioned within outer member 19 has a modulus of elasticity greater than the modulus of elasticity the outer member 19 would have without the core being bonded to it.

The pair of circular end caps 20 and 21 are connected to the opposite ends of the outer member 19. In the preferred embodiment the end caps 20 and 21 are formed of a conventional titanium alloy such as Ti-6Al-4V. Further, in one embodiment the end caps 20 and 21 are welded to the outer member 19 to form an evacuated air tight sealed assembly. An electron beam welding operation, that is well known to those skilled in the art, is one method to weld the end caps 20 and 21 to the outer member 19. The pair of end caps 20 and 21 being fixedly mounted to the outer member 19 and creating a substantially fluid tight seal.

An assembly comprising the outer member 19, end caps 20 and 21 and inner member 22 is subjected to a hot isostatic pressing (HIP) operation. The HIP operation is performed in a conventional fashion to create a metallurgical bond between the inner member 22 and the outer member 19. U.S. Pat. No. 4,270,256 to Ewing is incorporated herein by reference, and includes general information on HIP processes. The HIP process insures intimate contact between the gamma titanium aluminide alloy inner member/core 22 and the outer member 19 so that they are connected by diffusion bonding therebetween to produce a high quality metallurgical joint therebetween.

The lightweight high temperature high stiffness member has significantly increased stiffness and temperature capabilities over conventional titanium alloy shafts. Further, subsequent to the inner member/core being bonded to the outer member, surface modification treatment can be selectively applied to the entire member 18, or portions thereof to increase the member's wear resistance characteristics. One form of surface modification treatment is generally known as plasma ion nitride.

One form of the hybrid member 18 includes the titanium alloy tube 19 with a fully consolidated gamma titanium aluminide inner member 22/core metallurgically bonded therein. One example of a hybrid member 18 comprises about 10% by volume titanium alloy and about 90% by volume gamma titanium aluminide alloy. It is understood that other mixture ratios are contemplated by the present invention. A hybrid member 18 having the above mixture forms a hybrid member system having a modulus of elasticity of about $23\times10^6$ psi at room temperature. This represents an approximate 44% increase in stiffness over conventional titanium alloy shafts with no increase in density. It is known that conventional titanium alloys and titanium aluminide alloys are very similar in density (on the order of about 0.150 to 0.160 lbs/in$^3$).

With reference to FIG. 5, there is illustrated another form of the lightweight high stiffness member 26 of the present invention. The lightweight high stiffness member 26 is substantially identical to member 18 with like numbers being utilized for identical parts herein. Member 26 includes at least one end fitting attachment member 25 connected to at least one of the end caps 20 and 21. The end fitting attachment member 25 may include, for example a spline or other feature necessary for coupling the member 18 to another component (not illustrated). In one form of the present invention mechanical attachment member 25 is formed of material having superior wear resistance characteristics to the titanium alloy outer member 19 and end caps 20 and 21. The attachment member 25 being coupled to one of the end caps 20 and 21 or the outer member 19 by inertia welding, or any other technique that produces a reliable connection. In an alternative embodiment the end cap has an attachment member formed integral therewith. Further, in an alternative embodiment the attachment member 25 is formed of a material having a wear resistance comparable to a titanium alloy.

Referring to FIGS. 6 & 7, there is illustrated an alternative form of the lightweight high stiffness member 30 of the present invention. The member 30 is substantially similar to the members 18 and 26 described herein, and like numbers will be used to represent identical items. In one embodiment, member 30 comprises a substantially cylindrical inner tube 31, a substantially cylindrical outer tube 32, and a substantially annular core 33 disposed therebetween. The inner tube 31 and the outer tube 32 being concentric. It is understood that other geometric shapes are contemplated herein, including but not limited to solid plates for flap type devices used in thrust vectoring systems, solid bars for use as actuator devices, and conical shapes for use in rotating and/or static structures.

Inner tube 31 and the outer tube 32 being formed of conventional titanium alloy, such as Ti-6Al-4V, or Beta 21S available from Titanium Metals, Denver Colo. Beta 21S being well known as an oxidation resistant alloy. The annular core 33 is formed of a gamma titanium aluminide alloy material. Annular core 33 is metallurgically bonded to the outer surface 31a of tube 31 and the inner surface 32a of outer tube 32. A pair of opposite annular end caps 34 and 35 are connected at each end of the tubes 31 and 32. A circular recess 34a and 3a is formed in the end caps 34 and 35 respectively to receive and position the opposite ends of the inner and outer tubes 34 and 35 therein. A substantially cylindrical aperture 37 extends longitudinally through the shaft 30 parallel to a centerline X.

A method to produce a lightweight high stiffness hybrid member will now be described with reference to FIGS. 3–7. A preferred technique for producing the hybrid member 18 involves providing a tube 19 having in its interior a core of gamma titanium aluminide alloy material having a modulus of elasticity greater than the modulus of elasticity of the tube 19. The gamma titanium aluminide alloy material has been placed in the cavity within the tube 19 and a metallurgical bond is created between the tube 19 and the material so that the resulting member has a modulus of elasticity greater than the modulus of elasticity that the tube would have without the material bonded to it.

In one embodiment, the technique and method of fabricating a lightweight high stiffness member 18 further includes sealing one end of the tube 19 before the gamma titanium aluminide material is placed therein. It is understood that the present method works for a vast assortment of member configurations. It is preferred that an end cap 20 or 21 is welded to the tube 19 prior to the gamma titanium aluminide alloy material being placed therein. After the gamma titanium aluminide alloy material has been placed in the interior of the tube the opposite other end is sealed off with the other end cap 20 or 21. The opposite other end cap is then welded to the tube 19. During the welding of the end cap to the tube 19 the inner cavity 9 is evacuated to keep it as free of air as possible. A connection linking the inner cavity 9 to an external evacuation device is not illustrated. Following the evacuation and sealing steps the assembly is hot isostatically pressed (HIP) to bond the inner gamma titanium aluminide alloy member 22 to the tube 19, thereby forming a metallurgical bond between the tube 19 and the inner member 22.

Hot isostatic pressing (HIP) is generally known to those skilled in the art, and in fabricating member 18 the titanium alloy tube-titanium aluminide core assembly is placed in a HIP vessel (not illustrated). At elevated temperature, high-pressure gas inside the pressure vessel applies a hydrostatic force to the outer surfaces 19a, 20a, and 21a of the member assembly. At the HIP temperature, the material comprising the inner member/core 22 and the titanium alloy outer member 19 have greatly reduced strength and provide very little resistance to movement under the effect of the HIP pressure. Therefore, the titanium alloy tube 19 moves toward the inner member/core 22 as a result of the pressure and heat exerted during the HIP process. The HIP process causes the titanium alloy tube member 18 to be metallurgically bonded to the inner member/core 22.

In a preferred embodiment the tube 19 is constructed of a titanium alloy having a modulus of elasticity of about 16×106 psi, and the inner member 22 is formed of a extruded gamma titanium aluminide composition having a modulus of elasticity of about 24 ×106 psi. A titanium mechanical attachment member 25 is connected to one of the end caps 20 and 21. If required, the mechanical attachment member 25 can be of hardened steel that can be inertia welded to one of the end caps 20 or 21. In a further step of fabricating the member 18, a surface modification treatment is applied to the tube 19 and/or the mechanical attachment member 25. In the preferred embodiment the surface modification treatment includes plasma ion nitride.

With reference to FIG. 6, there is illustrated the member 30 having aperture 37 formed therethrough. The method of fabricating member 30 is substantially the same as the method of fabricating member 19. In fabricating hybrid member 30, one end of the inner tube 30 is positioned within a recess 34a or 35a, formed in one of the end caps 34 or 35 respectively. The outer tube 32 is placed on the same end cap as above and the annulus between the outer tube 32 and the inner tube 31 is loaded with a gamma titanium aluminide core. The other end of the inner tube is then positioned within the recess 34a or 3a in the other end cap. End caps 34 and 35 are than welded to the outer tube 32 and the assembly is subjected to a hot isostatic pressing operation to produce member 30.

The inner core members 22 and 33 of FIGS. 3, 4, 6 and 7 are formed of a gamma titanium aluminide alloy. More specifically the present invention defines a hybrid member having a gamma titanium aluminide alloy core. The high stiffness core can be representative of the powder metal, cast, or wrought alloy forms of gamma titanium aluminide. Further, the gamma titanium aluminide alloy core in the powder metal and cast form can be subjected to a wrought processing step prior to the metallurgical bonding operation. A wrought processing operation includes, but is not limited herein to, extruding, forging, rolling, co-extruding, isothermal forging. Therefore, the gamma titanium alloy core can be: a powder metal alloy form; a powder metal alloy form that has been processed by a wrought processing operation; a cast alloy form; or a cast alloy form that has been processed by a wrought processing operation. In one embodiment it has been found that the extrusion of the gamma titanium alloy core prior to cladding with a conventional titanium material and subjection to a HIP process results in a member having particularly desirable strength characteristics.

Figure 8:
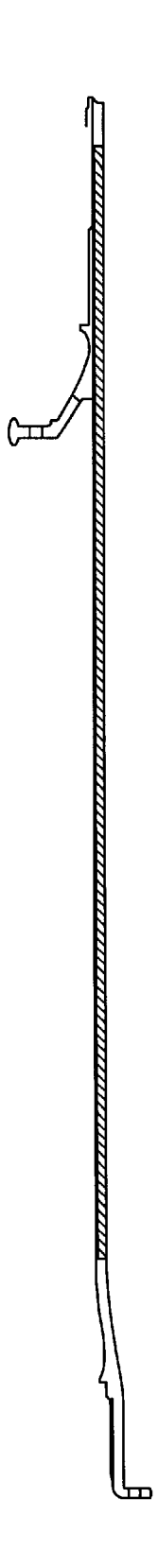
FIG. 8 is a side elevational view of one embodiment of a lightweight high stiffness member of the present invention with mechanical attachment detail.

With reference to FIGS. 8–11 there is illustrated a member 18 having an assortment of coupling means attached thereto. More particularly FIG. 8 shows a sectional meridian plane view of one embodiment of the present invention. The member shown typically will include flanged or splined ends. However, other types of mechanical attachment features are contemplated herein. Attached to one or both of the respective ends of the member can be details such as drive hubs, couplings, bearing support hardware, and/or flexible couplings. For the hybrid member of the present invention the mechanical attachment features at the ends of the member do not have to be formed of the gamma titanium aluminide alloy. However, in one embodiment they are formed of the gamma titanium aluminide alloy.

Figure 9:
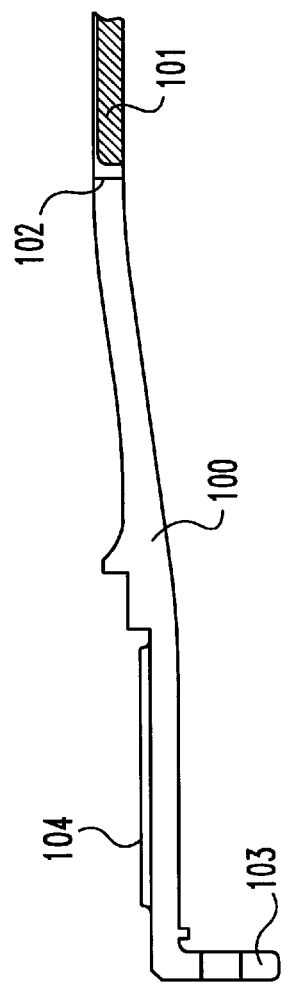
FIG. 9 is an enlarged partial view of the forward end mechanical attachment detail of the FIG. 8 lightweight high stiffness member.

Referring to FIG. 9 there is illustrated a forward end detail of the member of FIG. 8. In the member of FIG. 9 there is a titanium alloy portion 100 that is joined to the hybrid portion 101 at the joint 102. The titanium alloy portion having a flange 103 and a spline 104 formed therein. In one embodiment the joining defines a welded joint, however the joining is not intended herein to be limited to a welding connection.

Figure 10:
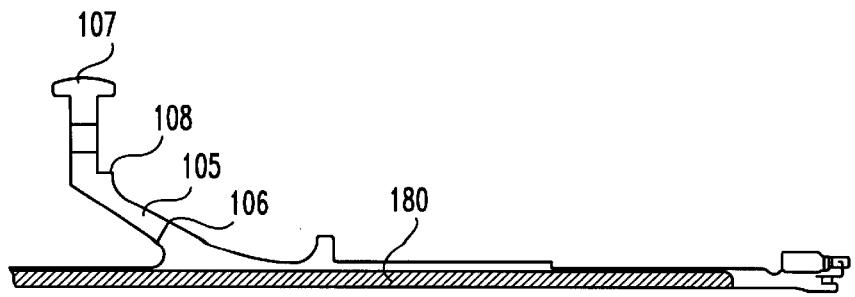
FIG. 10 is an enlarged partial view of the aft end detail of the FIG. 8 lightweight high stiffness member.

With reference to FIG. 10, there is illustrated one embodiment of the aft end detail for the member of FIG. 8. The embodiment has a joining of the mechanical attachment feature 105 to the hybrid member 180. The hybrid member 180 being coupled to the mechanical attachment feature 105 at a joint 106. More specifically in the embodiment of FIG. 10, the mechanical attachment feature 105 is formed of a titanium alloy and includes a flange 107 and a drive cone 108. In one embodiment the joining defines a welded joint, however the joining is not intended herein to be limited to a welded connection.

Figure 11:
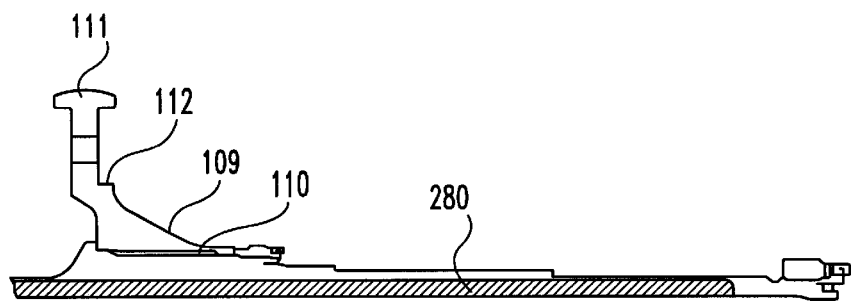
FIG. 11 is an enlarged partial view of the aft end detail of another embodiment of the lightweight high stiffness member of the present invention.

Referring to FIG. 11, there is illustrated another embodiment of the aft end detail for a member similar to FIG. 8. The embodiment utilizes has a mechanical attachment feature 109 that is mechanically coupled to the hybrid member 280. The hybrid member 280 is coupled to the mechanical attachment feature 109 at a mechanical spline joint 110. More specifically in the embodiment of FIG. 11, the mechanical attachment feature is formed of a titanium alloy and includes a flange 111 and a drive cone 112.

Figure 12:
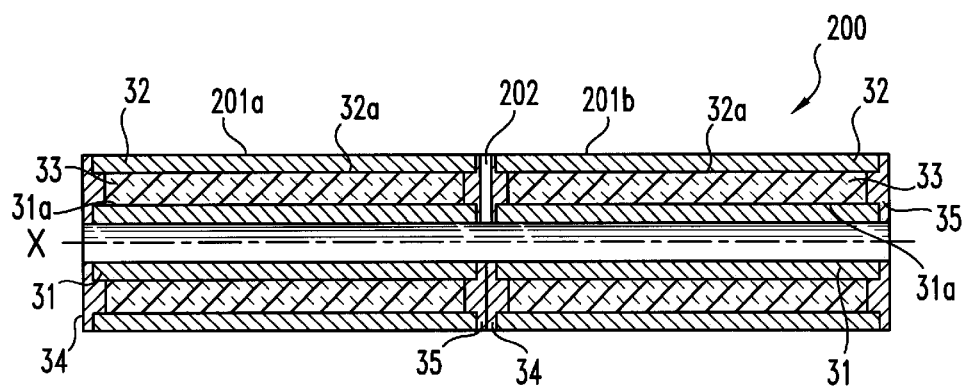
FIG. 12 is a side elevational view in section of another form of the present invention in section.

With reference to FIG. 12, there is illustrated another embodiment of the lightweight high stiffness member 200 of the present invention. The member 200 is similar to the members 18, 26 and 30 and like numbers will be used to represent identical items. The members shown in FIGS. 3–7 preferably have a single continuous gamma titanium aluminide core. The member 200 is formed from a plurality of hybrid gamma titanium segments 201 that are subsequently joined together to form the member assembly 200. The plurality of segments 201 are joined together in the conventional titanium alloy portions of the member 200. In one embodiment the segments are of equal length, however in an alternate embodiment the segments are of unequal length. In one embodiment the segments 201 are welded together at a joint 203. The welding process may be an electron beam operation, an inertia welding operation or other manufacturing joining techniques that are known to a person of ordinary skill in the art. As discussed with regards to the members of FIGS. 3–7 the hybrid gamma titanium segments 201 have the inner member/core 33 which is formed of a gamma titanium aluminide alloy bonded to the outer surface 3 la of tube 31 and the inner surface 32a of outer tube 32. While FIG. 12 shows one embodiment of the assembly of a plurality of hybrid gamma titanium segments it is not meant to be limited thereto. Alternate embodiments having the geometric shapes and detail as defined within, but not limited, to this document are contemplated as being manufactured from a plurality of joined hybrid gamma titanium segments.

In one embodiment the member 200 has a metering/bleed aperture 202 at intermediate positions along the member 200 within the conventional titanium alloy regions. In another embodiment there are a plurality of spaced metering/bleed apertures 200 in the member 200. The metering/bleed aperture 202 is in fluid communication with a central aperture running through the member 200. Further, the first segments 201a can be designed so as to have different characteristics from the second segment 201b. The characteristics can relate to but is not limited to a difference in materials, a difference in the thickness of the coverskin which is typically defined by the tubes, a difference in the volume of gamma titanium aluminide and conventional titanium alloy. More specifically the tubes 32 and 31 can have different properties between segments so as to facilitate the tailoring of portions of the member 200 for operation in different temperature environments. In another embodiment the member has joined together segments having different sizes so as to allow steps in the member.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for manufacturing an apparatus, comprising:
providing a member having in its interior a gamma titanium aluminide core having a modulus of elasticity greater than the modulus of elasticity of the member; and
creating a metallurgical bond between the member and the gamma titanium aluminide core so that the apparatus has a modulus of elasticity greater than the modulus of elasticity that the member would have without the core being bonded to it.

2. The method of claim 1 wherein said creating includes hot isostatically pressing the member and the core.

3. The method of claim 2, wherein in said providing the member is of a titanium alloy, and wherein the core is formed of a powder metal alloy.

4. The method of claim 3, wherein the core has been subjected to a wrought process prior to said providing.

5. The method of claim 4, wherein said wrought process defines an extrusion process.

6. The method of claim 2, wherein in said providing the member is of a titanium alloy, and wherein the core is of a cast form.

7. The method of claim 6, wherein the core is subjected to a wrought process prior to said providing.

8. The method of claim 7, wherein said wrought process defines an extrusion process.

9. The method of claim 1, which further includes extruding the core prior to said providing so as to condition the core to a high strength level.

10. The method of claim 9, wherein said providing further includes a pair of end caps, and further includes attaching the pair of end caps to the member prior to said creating.

11. The method of claim 10, which further includes evacuating the air from within the member prior to said creating.

12. The method of claim 11, wherein said attaching is defined by welding the pair of end caps to the member.

13. The method of claim 12, wherein in said attaching the welding defines electron beam welding.

14. The method of claim 10, wherein at least one of the end caps are adapted for providing attachment to an adjacent structure.

15. The method of claim 10, which includes providing an attachment portion, and which further includes coupling the attachment portion to one of the end caps.

16. The method of claim 15, wherein in said providing the attachment portion defines a steel fitting; and said coupling includes inertia welding the steel fitting to one of the end caps.

17. The method of claim 2, which further includes applying a surface modification treatment to at least a portion of the member.

18. The method of claim 17, wherein said applying a surface modification treatment includes plasma ion nitriding.

19. An apparatus, comprising:
a member; and
a core of gamma titanium aluminide material positioned within said member and metallurgically bonded thereto, wherein the apparatus has a room temperature modulus of elasticity greater than the room temperature modulus of elasticity the member would have without said core bonded therein and a density about equal to the density of said member.

20. The apparatus of claim 19, wherein said core is of a powder metal form.

21. The apparatus of claim 20, wherein said core is of a powder metal form that has been processed by a wrought processing operation.

22. The apparatus of claim 21, wherein said core has been extruded, and wherein said member is formed of a titanium alloy.

23. The apparatus of claim 19, wherein said core is of a cast form.

24. The apparatus of claim 23, wherein said core is of a cast form that has been wrought processed.

25. The apparatus of claim 24, wherein said core has been extruded, and wherein said member is formed of a titanium alloy.

26. The member of claim 19, which further includes an end cap coupled to said member.

27. The member of claim 26, wherein said end cap is fixedly mounted to said member and formed of the same material as said member.

28. The member of claim 27, wherein at least a portion of said member having a greater wear resistance than the rest of said member.

29. The member of claim 28, wherein said at least a portion has characteristics consistent with a plasma ion nitride surface modification treatment.

30. The member of claim 26, which further includes a mechanical attachment member coupled to said end cap.

31. The member of claim 30, wherein said mechanical attachment member has a spline formed thereon.

32. The member of claim 31, wherein said mechanical attachment member has a drive cone theron.

33. The member of claim 30, wherein said mechanical attachment member is joined to said end cap, and wherein at least a portion of said mechanical attachment member is more wear resistant than said member.

34. The member of claim 30, wherein said mechanical attachment member is mechanically coupled to said end cap, and wherein at least a portion of said mechanical attachment member is more wear resistant than said member.

35. A member, comprising:
a tube; and
a gamma titanium aluminide core positioned within and metallurgically bonded to said tube, wherein the member has a room temperature modulus of elasticity greater than the room temperature modulus of elasticity that the tube would have without said core bonded thereto and the member has a density about equal to the density of said tube.

36. The member of claim 35, wherein said tube has an aperture therethrough and said core is positioned within said aperture.

37. The member of claim 36, wherein said tube is formed of a titanium alloy.

38. The member of claim 37, wherein said tube has a first end and an opposite second end, and which further includes a pair of end members, wherein one of said end members is fixidly joined to said first end and the other of said pair of end members is fixidly joined to said second end.

39. The member of claim 38, which further includes a mechanical attachment member adapted for coupling the member to a structure, and wherein said tube has a longitudinal centerline and said aperture is parallel to said centerline.

40. The member of claim 38, wherein a portion of an outer surface of said tube has superior wear resistant characteristics than the rest of said tube.

41. The member of claim 38, wherein said core is of a powder metal.

42. The member of claim 41, wherein said core is of a powder metal alloy form that has been processed by a wrought processing operation.

43. The member of claim 42, wherein said core has been extruded, and said end members are formed of the substantially same material as said tube.

44. The member of claim 38, wherein said core is of a cast form.

45. The member of claim 44, wherein said core is a cast form which has been processed by a wrought processing operation.

46. The member of claim 45, wherein said core has been extruded, and wherein said pair of end members are formed of substantially the same material as said tube.

47. The member of claim 35, wherein said tube defines an outer tube, and which further includes an inner tube spaced inwardly from said outer tube, said core being positioned between said outer tube and said inner tube.

48. The member of claim 47, wherein said outer tube and said inner tube are substantially concentric, and wherein said tubes are formed of a titanium alloy.

49. The member of claim 48, wherein said core is formed of powder metal.

50. The member of claim 49, wherein said core is of a powder metal form that has been subjected to a wrought processing operation.

51. The member of claim 50, wherein said wrought processing operation defines an extrusion operation.

52. The member of claim 48, wherein said core is of a cast form.

53. The member of claim 52, wherein said core has been wrought processed.

54. The member of claim 53, wherein said core has been extruded.

55. An apparatus, comprising:

a first segment comprising a first member having a first core of gamma titanium aluminide material positioned therein and metallurgically bonded thereto;

a second segment comprising a second member having a second core of gamma titanium aluminide material positioned therein and metallurgically bonded thereto; and said first segment and said second segment are fixidly joined together, and the apparatus has a room temperature modulus of elasticity greater than the room temperature modulus of elasticity that said first member or said second member would have without their respective core bonded therein and a density about equal to the density of said members.

* * * * *